Sept. 27, 1932.  A. W. MORTON ET AL  1,879,988
ROD PACKING
Filed July 19, 1930   2 Sheets-Sheet 1
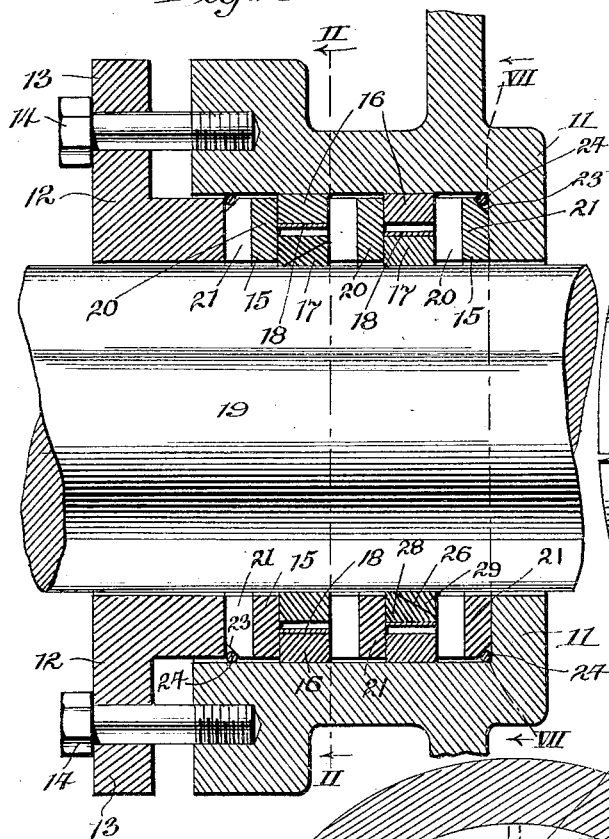
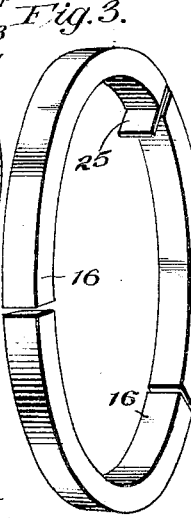
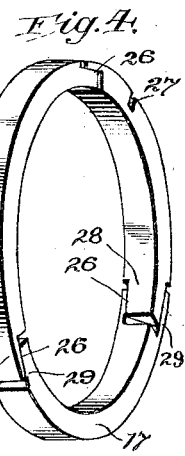
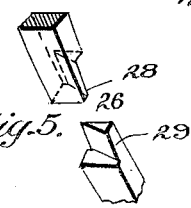
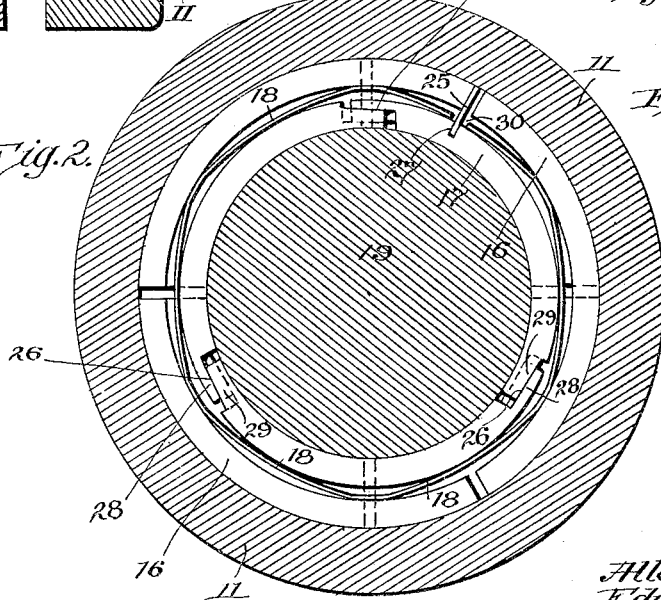
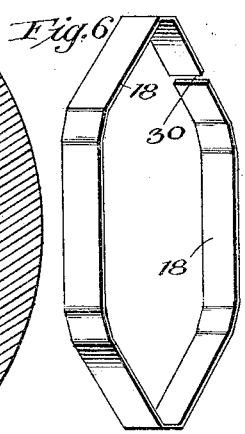
Inventors
Allen W. Morton
Edward Stead.
By Dodge and Sons
Attorneys.

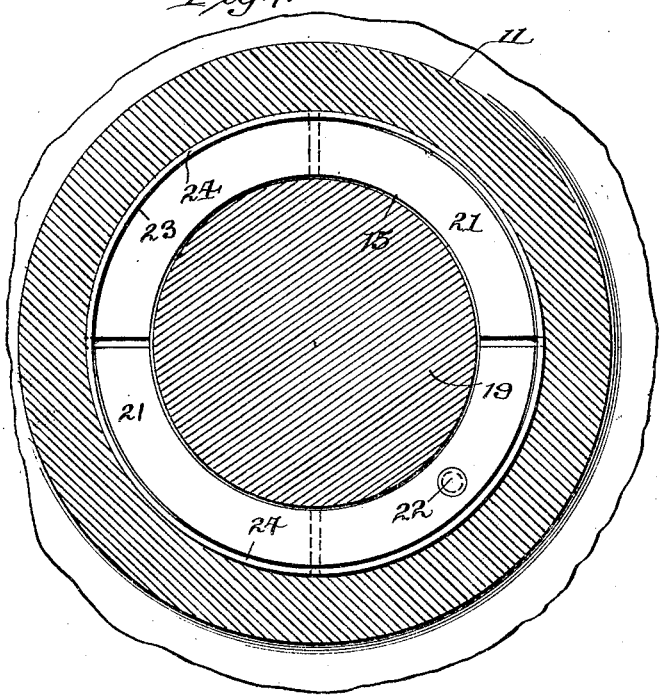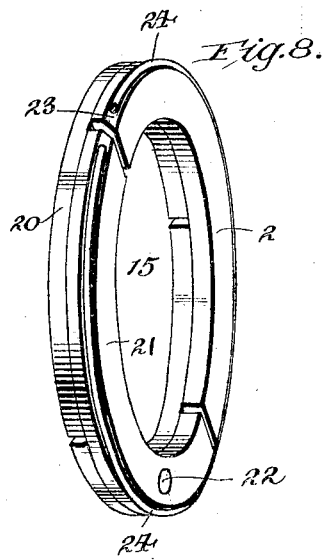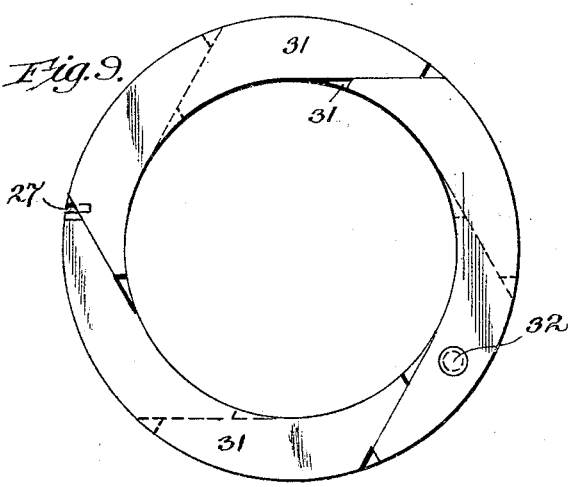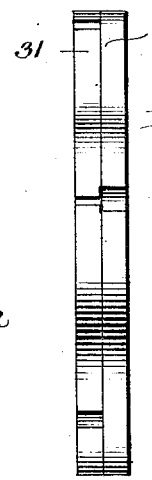

Patented Sept. 27, 1932

1,879,988

UNITED STATES PATENT OFFICE

ALLEN W. MORTON AND EDWARD STEAD, OF BALTIMORE, MARYLAND, ASSIGNORS TO THE AMERICAN HAMMERED PISTON RING COMPANY, OF BALTIMORE, MARYLAND, A CORPORATION OF MARYLAND

ROD PACKING

Application filed July 19, 1930. Serial No. 469,164.

Our invention relates to rod packings, and particularly to packings of the metallic type made up of several cooperating rings. Rings of this type are employed in packing the piston rods of steam locomotives, gas engines, compressors and other rods, either of reciprocating or rotating types, which are subjected to very heavy loads and are required to withstand high fluid-pressures without leakage.

One of the objects of our invention is to provide a packing which will produce a fluid-tight seal without subjecting the piston rod to rapid wear such as would be caused by excessive pressure on the rod.

Another object is to produce a packing which can be installed over a rod without removing the piston or other connections, and a packing which is adapted for use in any mechanism where it is necessary for the packing to be made up entirely of segments.

A further object is to provide a packing capable of conforming to slight irregularities in the piston rod without leakage, and having rings which are full floating to allow for misalignment.

Still another object is the provision of a packing which can be simply and readily adjusted to compensate for wear and in which a single set of tension elements will cause close engagement between the segments of the packing and the wearing surfaces associated with both the inside and the outside of the packing.

Other objects will appear from the following description when read in conjunction with the accompanying drawings, in which Figure 1 is a sectional view of one form of packing embodying our invention;

Fig. 2 is a section on line II—II of Fig. 1;

Figs. 3 and 4 are detailed views of spacer and wearing rings, respectively adapted for use in this packing;

Fig. 5 is a detailed view of a form of joint which is particularly well adapted for producing a tight seal between the segments of the various rings employed in this packing;

Fig. 6 is a view of a preferred form of tension ring;

Fig. 7 is a section on line VII—VII of Fig. 1;

Fig. 8 is a view of one form of separator ring suitable for use in this packing;

Figs. 9 and 10 are front and side views, respectively, of a modified form of wearing ring which may be used in this packing.

Referring to Fig. 1, the reference character 11 designates a stuffing box of conventional form, adapted to receive a rod packing and having its open end closed by a suitable packing gland 12. Gland 12 is provided with an exterior flange 13, perforated at intervals to receive cap screws 14 which hold the gland in position and maintain the segments of the packing in proper relative relation one to another.

The packing is made up of a series of double separator rings 15 held in spaced relation by spacer rings 16. Inside of each of the spacer rings 16 is a segmental wearing ring 17. In the space between each spacer ring and the associated wearing ring is a corrugated or polygonal tension ring 18 which forces the segments of the wearing ring 17 inwardly against the piston rod 19 and the segments of the spacer ring 16 outwardly against the inside wall of the stuffing box 11.

As here shown, the separator rings 15 (Figs. 7 and 8) are made up of two individual rings 20 and 21 each comprising two segments. These rings are preferably secured together by a pin 22 so that the joints are held in staggered relation and cannot rotate relatively so as to allow leakage through the joints. As shown in Fig. 8, the ring 21 is chamfered at 23 in order to receive a soft metal gasket 24. The separator rings at the bottom of the stuffing box, and also adjacent to the gland 12, are constructed in this manner so as to tightly seal the exterior surfaces of the separator rings with respect to the stuffing box. The central separator ring, however, is made up of two rings similar to ring 20 and no gasket is necessary.

Spacer rings 16 may be formed of any suitable number of segments, and these segments may be connected by any suitable form of joint. As here shown this ring is made up of three segments divided by straight radial cuts. Associated with one of the segments of ring 16 is a keeper 25 provided for a purpose which will appear hereinafter.

Inside of each of the spacer rings 16 and suitably spaced therefrom is a segmental wearing ring 17. As shown in Fig. 4 this ring is made up of three segments joined by stepseal joints 26, and one of the segments contains a slot 27 adapted to receive the inner end of keeper 25 which prevents the joints of the spacer and wearing rings from lining up by preventing relative rotation between these rings. Such a keeper is unnecessary when the packing is used in connection with a reciprocating shaft, but is preferably used in connection with a rotating shaft.

The joint 26, shown in detail in Fig. 5, is particularly effective in preventing leakage of fluid-pressure through the joints, and comprises two legs 28 and 29, one of which is pentagonal and the other of which is triangular, in cross section. The plane faces of these legs meet in a plane which cuts one plane face of the ring and the inner face of the ring, and the parts are so arranged that regardless of the amount of separation occurring at the joint the seal will be effective.

This particular form of joint is described and claimed in a patent of Allen W. Morton, No. 1,756,905, dated April 29, 1930.

In order to prevent leakage between the outside surface of the piston rod 19 and the various rings of the packing, it is essential not only that wearing rings 17 be held tightly against the piston rod, but also that spacer rings 16 be kept in intimate relation with the inside surface of stuffing box 11. This result is obtained herein by the use of a single corrugated or polygonal tension ring 18. This ring may be composed of thin strip steel and can be sprung over the shaft or rod without fear of distortion or breakage. As shown in Figs. 2 and 6, the ring 18 is more or less hexagonal in shape and the two ends are separated by a slight gap 30 which receives the keeper 25 when the packing is assembled.

The clearance between the inside of ring 16 and the outside of ring 17 is so chosen, that when a tension ring 18 is placed in position it constantly tends to force the wearing ring 17 inwardly into intimate contacting relation with the outside of rod 19, and also tends constantly to force the spacer ring 16 outwardly. When the parts are in place as shown in Fig. 2, the tension ring is therefore somewhat distorted in shape. When the packing is assembled and gland 12 is tightly bolted in position, the separator rings 15 and spacer rings 16 are locked in place. In order to allow the wearing rings 17 to adjust themselves under the action of tension rings 18, the rings 17 are made of such axial thickness as to enter the chamber between the associated separator rings with a sliding fit, and to prevent fluid-pressure from escaping between their edges and the walls of the chamber but not to produce objectionable friction. The tension rings 18 are likewise of an axial thickness slightly less than that of the spacer rings 16, so that both the tension and the wearing rings are in freely floating relation within the chambers which they occupy, and hence can adjust themselves to misalignment and to irregularities in the piston rod surface.

When the packing has been in use for some time and the parts have become somewhat loosened by wear, the gland 12 can be loosened up so as to allow tension rings 18 to readjust the parts until spacer rings 16 contact closely with the inner wall of the stuffing box. The wearing rings 17 will, of course, tightly engage the outer surface of rod 19 at all times. By tightening gland 12 again, the packing will be restored to a leak-proof condition. It will be noted that the joints 26 in the two wearing rings 17, shown in Fig. 1, are placed in the same relation. The object in doing this is to seal the inside diameter of the wearing ring and the space between the wearing ring and spacer ring. If, for example fluid-pressure enters the packing from the right, it will, by means of the stepseal joint, in each case be prevented from passing through the joint to the space between the wearing ring and the spacer ring and also be prevented from passing the face of the wearing ring which bears against the rod. In this way a single wearing ring can be made to produce a more perfect seal than has heretofore been possible by using a much more expensive and complicated construction.

In Figs. 9 and 10 we have shown a modified form of wearing ring. This ring is made up of two segmental rings 31 pinned together at 32 to prevent the joints from lining up, and each having its joints formed by angular cuts so that when wear takes place on the inner faces of the rings, the segments will move radially inward but the plane of intersection of the joints being tangent to the periphery of the rod the joints will remain closed. This modified form of ring is also shown as provided with a slot 27 to receive the keeper 25 on the associated spacer ring.

It will be clear from the foregoing that we have designed a ring capable of simple adjustment and adapted to produce a tight seal under all conditions of use.

Various changes may be made in the details of our invention, within the scope of the appended claims, without departing from the spirit and scope of our invention.

What is claimed is:

1. A metal packing for rods comprising a stuffing box; a packing gland mounted for adjustment in one end thereof; a plurality of separator rings in said box; means including spacer rings cooperative with said gland for holding said separator rings in rigid spaced relation one to another and to said box; a wearing ring between each two separator rings and in freely floating relation thereto; a flat spring member of irregular contour surrounding each wearing ring and tending to force it radially inwardly against the rod and away from the stuffing box wall; and means associated with each of the spacer rings to prevent rotation of the companion wearing ring relative thereto.

2. A metal packing for rods comprising a stuffing box; a plurality of segmental separator rings disposed within said box; a segmental spacer ring between each two separator rings, said separator and spacer rings being axially non-yieldable and in direct contact throughout the series; a segmental wearing ring mounted within and spaced from the spacer ring and likewise free of the adjoining separator rings; means between each spacer ring and the associated wearing ring, tending to contract the wearing ring; a gland adjustably mounted on the box, acting to hold the separator and spacer rings in fixed relation to each other and to the box; and a keeper associated with each of the spacer rings and cooperating with the companion wearing ring for preventing relative rotation of said rings.

3. A universal metal packing for use in sealing either rotating or reciprocating rods comprising a stuffing box; a plurality of alternately disposed separator and spacer rings mounted in said box, and forming a plurality of annular chambers; a keeper on each of said spacer rings; a segmental wearing ring disposed in each of said chambers to float radially therein, and having means cooperating with the keeper of the associated spacer ring for preventing relative rotation of said rings; a flat one-piece spring ring of irregular contour disposed in each of said chambers and bearing against the associated spacer and wearing rings to centralize the packing with reference to the rod and box, and to hold the wearing rings against the rod; and means for holding the separator and spacer rings in rigid fixed relation to each other and to the box.

In testimony whereof we have signed our names to this specification.

ALLEN W. MORTON.
EDWARD STEAD.